Aug. 28, 1923.

L. JOHNSON

ARTIFICIAL FISH LURE

Filed May 5, 1922

1,466,231

Inventor
Louis Johnson.
By Milo B. Stevens
Attorney

Patented Aug. 28, 1923.

1,466,231

UNITED STATES PATENT OFFICE.

LOUIS JOHNSON, OF CHICAGO, ILLINOIS.

ARTIFICIAL FISH LURE.

Application filed May 5, 1922. Serial No. 558,567.

*To all whom it may concern:*

Be it known that I, LOUIS JOHNSON, a citizen of the United States, residing at Chicago, in the county of Cook and State of Illinois, have invented new and useful Improvements in Artificial Fish Lures, of which the following is a specification.

My invention relates to artificial fish lure of the "spoon" variety, and has for its principal object the provision of a novel and improved fish lure of this kind, which when drawn through the water will assume a wiggling motion characteristic of a minnow.

A further object of the invention is to provide an article of the kind stated which will not become caught in weeds when in use, and wherein the hook will be concealed from the view of the fish.

A still further object of the invention is to furnish a fish lure of a strong and durable construction comprising few parts, and which may be cheaply manufactured.

With the above and other objects in view, as will become more apparent as the description proceeds, the invention comprises certain novel features of construction to be hereinafter described and claimed, and in order that the same may be better understood, reference is had to the accompanying drawing, forming a part of this specification.

Figure 1:
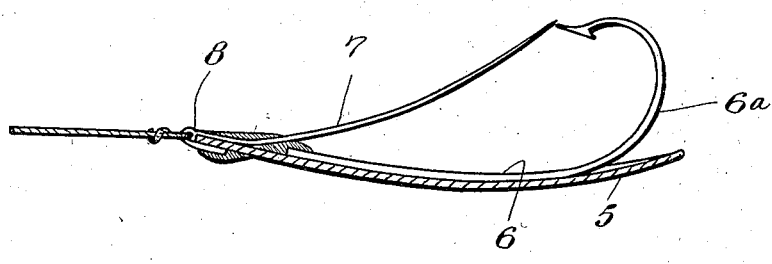
Figure 1 is a longitudinal section through a fish lure embodying my invention.
Figure 2:
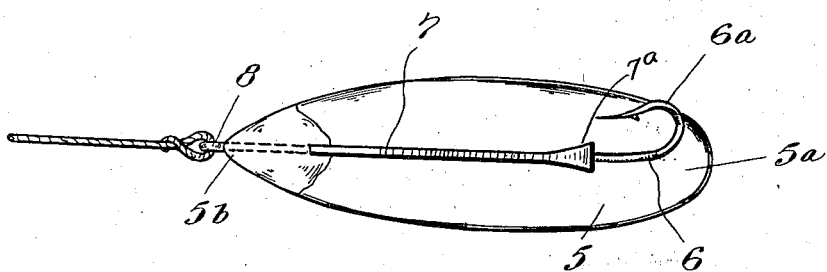
Fig. 2 is a plan view thereof.
Figure 3:
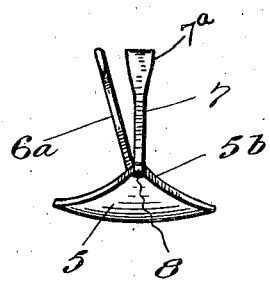
Fig. 3 is a front elevation.

Referring specifically to the drawing, wherein like reference characters designate like parts throughout the several views, numeral 5 denotes a concavo-convex plate or spoon one end of which is relatively broad and rounded as shown at 5ª while the other end is narrowed and tapered inwardly from the medial portion of the spoon to the point 5ᵇ. A hook 6 is soldered or otherwise fastened upon the concave surface of the spoon 5 and extends longitudinally thereof but does not project beyond the rounded end 5ª of the spoon. The barbed end 6ª of the hook is bent laterally to one side as shown in Fig. 2, for a purpose to be presently described.

At the pointed end 5ᵇ of the spoon 5 a resilient member 7 of spring metal, or other suitable material, is fastened and which projects beyond the pointed end 5ᵇ and is bent backwardly and inwardly to contact with the convex side of the spoon 5 to form an eye 8 for the reception of a line. I have shown the member 7 as soldered to the spoon but it will be understood that various other suitable means of securing the same may be employed. From the pointed end 5ᵇ of the spoon, the member 7 extends longitudinally above the shank of the hook 6 and above the plane of the barbed end 6ª of the hook. The free end of the member 7 is flattened as shown at 7ª and extends slightly beyond the barb 6ª of the hook. This member 7 serves as a weed guard to direct weeds and other foreign matter above and beyond the plane of the barb of the hook, but is so positioned as not to be in the way of the hook so as not to impede the hooking of the fish.

When drawn through the water, the spoon 5 will rest upon its convex surface, thus holding the hook upwardly. The pointed forward end 5ᵇ of the spoon travels nearly in a straight line but the broadened rear end 5ª moves from one side to the other a distance about an inch at the same time turning from one side to the other to angles of about 45 degrees. This produces not a wabbling or rotary motion, but a fast wiggling motion to assimilate a minnow. Since the spoon 5 does not revolve, a swivel is unnecessary. I have found it very advantageous to position the hook 6 upon the concave or upper surface of the spoon, since the spoon when drawn through the water rides near the surface thereof, and the fish being below cannot see the hook.

The preferred embodiment of the invention has been disclosed but it will be understood, that various slight changes and modifications may be made therein within the spirit and scope of the subject matter as claimed.

I claim:

1. A device of the class described comprising a concavo-convex plate having a relatively broad rounded end and the other end being narrow and tapering to a point, a fish hook secured upon the concave surface of said plate longitudinally thereof with its barbed end terminating short of the broadened end of said plate, a resilient member fastened to the pointed end of said plate upon the concave side thereof and extending above the shank of said hook above the plane of the barb, and an eyelet at the pointed end of said plate for the reception of a line.

2. A device of the class described comprising a concavo-convex plate having a relatively broad rounded end and the other end being narrow and tapering to a point, a fish hook secured upon the concave surface of said plate longitudinally thereof with its barbed end terminating short of the broadened end of said plate, said barbed end being bent laterally toward one side of said plate, a resilient member fastened to the pointed end of said plate upon the concave side thereof and extending above the shank of said hook above the plane of the barb, and an eyelet at the pointed end of said plate for the reception of a line.

3. A device of the class described comprising a concavo-convex plate having a relatively broad rounded end and the other end being narrow and tapering to a point, a fish hook secured upon the concave surface of said plate longitudinally thereof with its barb in proximity to the broadened end of said plate, a resilient member fastened to the pointed end of said plate upon the concave side thereof and extending above the shank of said hook above the plane of the barb, said resilient member being formed with an eyelet at the pointed end of said plate for the reception of a line.

In testimony whereof I affix my signature.

LOUIS JOHNSON.